US012640105B2

(12) United States Patent
Chen et al.

(10) Patent No.: US 12,640,105 B2
(45) Date of Patent: May 26, 2026

(54) DISPLAY OVERDRIVE CONTROL METHOD AND APPARATUS, AND TERMINAL DEVICE AND STORAGE MEDIUM

(71) Applicant: SHENZHEN TCL NEW TECHNOLOGY CO., LTD., Shenzhen (CN)

(72) Inventors: Yixin Chen, Shenzhen (CN); Renli Xie, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/102,394

(22) PCT Filed: Aug. 8, 2022

(86) PCT No.: PCT/CN2022/110751

§ 371 (c)(1),
(2) Date: Feb. 8, 2025

(87) PCT Pub. No.: WO2024/031212

PCT Pub. Date: Feb. 15, 2024

(65) Prior Publication Data

US 2026/0045231 A1 Feb. 12, 2026

(51) Int. Cl.
*G09G 3/34* (2006.01)

(52) U.S. Cl.
CPC ... *G09G 3/3406* (2013.01); *G09G 2320/0686* (2013.01); *G09G 2320/10* (2013.01); *G09G 2330/045* (2013.01); *G09G 2340/16* (2013.01)

(58) Field of Classification Search
CPC ....... G09G 2320/0686; G09G 2320/10; G09G 2330/045; G09G 2340/16; G09G 3/3406
See application file for complete search history.

(56) References Cited

U.S. PATENT DOCUMENTS 10,984,713 B1 4/2021 Tan
2008/0122769 A1* 5/2008 Takaki ................ G09G 3/3648 345/87

(Continued)

FOREIGN PATENT DOCUMENTS

CN 1804986 A 7/2006
CN 101266764 A 9/2008

(Continued)

OTHER PUBLICATIONS

International Search Report in International application No. PCT/CN2022/110751,mailed on May 8, 2023.

(Continued)

*Primary Examiner* — Robin J Mishler
(74) *Attorney, Agent, or Firm* — PV IP PC; Wei Te Chung

(57) ABSTRACT

A display overdrive control method includes: acquiring overdrive control reference parameters of multiple display screen partitions, backlight control information, and pixel signal statistical values of multiple dummy partitions for image frames to be displayed; according to the overdrive control reference parameters, the backlight control information and the pixel signal statistical values, predicting pixel signal amplitudes when the image frames are displayed; determining overdrive coefficients on the basis of mapping relationships between the pixel signal amplitudes and reference overdrive coefficients, and the pixel signal amplitudes; on the basis of the overdrive control reference parameters, the pixel signal amplitudes and the overdrive coefficients, predicting partition heat accumulation values; performing heat control correction on the overdrive coefficients according to the partition heat accumulation values and the overdrive control reference parameters, so as to obtain target overdrive coefficients; and performing over- (Continued)

drive control over a display device by means of the target overdrive coefficients.

20 Claims, 4 Drawing Sheets

(56) References Cited

U.S. PATENT DOCUMENTS

| | | | | |
|---|---|---|---|---|
| 2009/0267930 | A1 | 10/2009 | Sumi | |
| 2012/0075362 | A1 | 3/2012 | Ichioka | |
| 2013/0106924 | A1 | 5/2013 | Matsui | |
| 2013/0162701 | A1 | 6/2013 | Yang | |
| 2013/0169613 | A1* | 7/2013 | Chen | G09G 3/3611 345/212 |
| 2016/0247427 | A1* | 8/2016 | Fan | G09G 3/2007 |
| 2021/0407368 | A1* | 12/2021 | Gao | G09G 3/3685 |
| 2022/0036844 | A1* | 2/2022 | Chen | G09G 3/36 |
| 2022/0084454 | A1 | 3/2022 | Chappalli | |
| 2024/0021137 | A1* | 1/2024 | Hu | G09G 3/3426 |

FOREIGN PATENT DOCUMENTS

| | | | |
|---|---|---|---|
| CN | 101661713 | A | 3/2010 |
| CN | 102318001 | A | 1/2012 |
| CN | 103135272 | A | 6/2013 |
| CN | 104517579 | A | 4/2015 |
| CN | 104835458 | A | 8/2015 |
| CN | 107799086 | A | 3/2018 |
| CN | 108877678 | A | 11/2018 |
| CN | 108877694 | A | 11/2018 |
| CN | 112967687 | A | 6/2021 |
| CN | 113593480 | A | 11/2021 |
| CN | 114189687 | A | 3/2022 |
| CN | 114203086 | A | 3/2022 |
| EP | 1973092 | A2 | 9/2008 |
| JP | 2016114746 | A | 6/2016 |
| JP | 2022023448 | A | 2/2022 |
| KR | 20110033422 | A | 3/2011 |
| KR | 20110047656 | A | 5/2011 |
| WO | 2016106871 | A1 | 7/2016 |

OTHER PUBLICATIONS

Written Opinion of the International Search Authority in International application No. PCT/CN2022/110751,mailed on May 8, 2023.

European Office Action issued in corresponding European Patent Application No. 22954192.5 dated Apr. 16, 2026.

Notification to Grant Patent Right for invention issued in corresponding Chinese Patent Application No. 202210942366.5 dated Mar. 31, 2026.

* cited by examiner

| | | | |
|---|---|---|---|
| 1 | 0.9 | 0.9 | 1 |
| 1 | 0.8 | 0.8 | 1 |
| 1 | 0.8 | 0.8 | 1 |
| 1 | 0.9 | 0.9 | 1 |

401

402

| | | | |
|---|---|---|---|
| 0 | 0 | 0 | 0 |
| 100 | 500 | 0 | 0 |
| 300 | 0 | 0 | 0 |
| 50 | 0 | 0 | 0 |

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| 2 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| 3 | 0.8 | 0.8 | 0.8 | 0.88 | 0.88 | 0.88 | 0.88 | 0.88 | 0.88 | 0.88 | 0.88 | 0.88 | 0.88 | 0.88 | 0.88 | 0.88 | 0.88 | 0.88 |
| 4 | 0.8 | 0.8 | 0.8 | 0.88 | 0.88 | 0.88 | 0.88 | 0.88 | 0.88 | 0.88 | 0.88 | 0.88 | 0.88 | 0.88 | 0.88 | 0.88 | 0.88 | 0.88 |
| 5 | 0.8 | 0.8 | 0.8 | 0.88 | 0.88 | 0.88 | 0.88 | 0.88 | 0.88 | 0.88 | 0.88 | 0.88 | 0.88 | 0.88 | 0.88 | 0.88 | 0.88 | 0.88 |
| 6 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 7 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 8 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 9 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 10 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 11 | 0.8 | 0.8 | 0.8 | 0.88 | 0.88 | 0.94 | 0.94 | 0.94 | 0.94 | 0.94 | 0.94 | 0.94 | 0.94 | 0.94 | 0.94 | 0.94 | 0.94 | 0.94 |
| 12 | 0.8 | 0.8 | 0.8 | 0.88 | 0.88 | 0.94 | 0.94 | 0.98 | 0.98 | 0.98 | 0.98 | 0.98 | 0.98 | 0.98 | 0.98 | 0.98 | 0.98 | 0.98 |
| 13 | 0.8 | 0.8 | 0.8 | 0.88 | 0.88 | 0.94 | 0.94 | 0.98 | 0.98 | 0.98 | 0.98 | 0.98 | 0.98 | 0.98 | 0.98 | 0.98 | 0.98 | 0.98 |
| 14 | 0.8 | 0.8 | 0.8 | 0.88 | 0.88 | 0.94 | 0.94 | 0.98 | 0.98 | 0.98 | 0.98 | 0.98 | 0.98 | 0.98 | 0.98 | 0.98 | 0.98 | 0.98 |
| 15 | 0.8 | 0.8 | 0.8 | 0.88 | 0.88 | 0.94 | 0.94 | 0.98 | 0.98 | 0.98 | 0.98 | 0.98 | 0.98 | 0.98 | 0.98 | 0.98 | 0.98 | 0.98 |
| 16 | 0.8 | 0.8 | 0.8 | 0.88 | 0.88 | 0.94 | 0.94 | 0.98 | 0.98 | 1 | 1 | 1 | 1 | 1 | 1 | 1 | 1 | 1 |
| 17 | 0.8 | 0.8 | 0.8 | 0.88 | 0.88 | 0.94 | 0.94 | 0.98 | 0.98 | 1 | 1 | 1 | 1 | 1 | 1 | 1 | 1 | 1 |
| 18 | 0.8 | 0.8 | 0.8 | 0.88 | 0.88 | 0.94 | 0.94 | 0.98 | 0.98 | 1 | 1 | 1 | 1 | 1 | 1 | 1 | 1 | 1 |
| 19 | 0.8 | 0.8 | 0.8 | 0.88 | 0.88 | 0.94 | 0.94 | 0.98 | 0.98 | 1 | 1 | 1 | 1 | 1 | 1 | 1 | 1 | 1 |

DISPLAY OVERDRIVE CONTROL METHOD AND APPARATUS, AND TERMINAL DEVICE AND STORAGE MEDIUM

CROSS REFERENCE OF RELATED APPLICATION

This application is a US national phase application based upon an International Application No. PCT/CN2022/110751, filed on Aug. 8, 2022, entitled "DISPLAY OVERDRIVE CONTROL METHOD AND APPARATUS, AND TERMINAL DEVICE AND STORAGE MEDIUM", the disclosure of which is incorporated herein by reference in its entirety.

FIELD OF THE DISCLOSURE

The present disclosure relates to the field of display technology, specifically to a display overdrive control method, device, electronic device, and storage medium.

BACKGROUND

Overdrive technology is a driving technology in the field of display technology that can improve the display effect of display devices without increasing hardware costs. It can be understood that the display device generates heat during operation, and the use of overdrive technology can cause the heat to accumulate more quickly in the display device.

Currently, the main method used when applying overdrive technology is to pre-test a set of overdrive parameters that the display device can load using extreme detection images before the display device is marketed. This set of overdrive parameters is then used for overdrive control when the user uses the display device. However, using this scheme, where a set of extreme quantitative parameters is used to control the entire display device, can result in low precision of overdrive control, which affects the overdrive effect of the display device.

SUMMARY

Technical Problem

The problem with the existing technology is that using a set of extreme quantitative parameters to control the entire display device results in low precision of overdrive control, thereby affecting the overdrive effect of the display device.

Solution to Technical Problem

Technical Solution

Embodiments of the present disclosure provide a display overdrive control method, device, electronic device, and storage medium that can improve the overdrive duration and enhance the overdrive effect of the display device without changing the hardware structure of the display device.

An embodiment of the present disclosure provides a display overdrive control method, comprising:

obtaining overdrive control reference parameters, backlight control information, and pixel signal statistical values of multiple virtual partitions of an image frame to be displayed for multiple display screen partitions of a display device;

predicting a pixel signal amplitude of each display screen partition when displaying the image frame to be displayed based on the overdrive control reference parameters, the backlight control information, and the pixel signal statistical values;

determining the overdrive coefficients corresponding to the pixel signal amplitude from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficients;

performing a heat control correction on the overdrive coefficients of each display screen partition based on the partition heat accumulation value and the overdrive control reference parameters to obtain a target overdrive coefficient of each display screen partition; and performing an overdrive control on the display device through the target overdrive coefficient corresponding to each display screen partition.

Correspondingly, another embodiment of the present disclosure is directed to a display overdrive control device, comprising:

a parameter acquisition unit, configured to obtain overdrive control reference parameters, backlight control information, and pixel signal statistical values of a plurality of virtual partitions of an image frame to be displayed for a plurality of display screen partitions of a display device;

an amplitude prediction unit, configured to predict a pixel signal amplitude of each display screen partition when displaying the image frame to be displayed based on the overdrive control reference parameters, the backlight control information, and the pixel signal statistical values;

a coefficient determination unit, configured to determine overdrive coefficients corresponding to the pixel signal amplitude from the reference overdrive coefficients based on a mapping relationship between a preset pixel signal amplitude and the reference overdrive coefficients and the pixel signal amplitude;

a heat accumulation value prediction unit, configured to predict a partition heat accumulation value of each display screen partition when displaying the image frame to be displayed based on the overdrive control reference parameters, the pixel signal amplitude, and the overdrive coefficients;

a coefficient correction unit, configured to perform a heat control correction on the overdrive coefficients of each display screen partition based on the partition heat accumulation value and the overdrive control reference parameters to obtain a target overdrive coefficient of each display screen partition; and an overdrive control unit, configured to perform an overdrive control on the display device through the target overdrive coefficient corresponding to each display screen partition.

Optionally, the statistics unit is configured for obtaining the image frame to be displayed, and performing a partition processing on the image frame to be displayed to obtain the plurality of virtual partitions corresponding to the image frame to be displayed;

calculating an average pixel signal value and the maximum pixel signal value of each virtual partition as the pixel signal statistical values based on pixel signals corresponding to each pixel point in each virtual partition.

Optionally, the statistics unit is configured for obtaining the image frame to be displayed;

performing a non-uniform partition processing on the image frame to be displayed based on the pixel signals corresponding to each pixel point in the image frame to be displayed to obtain the plurality of virtual partitions corresponding to the image frame to be displayed.

Optionally, the amplitude prediction unit is configured for predicting the pixel signal amplitude of each display screen partition when displaying the image frame to be displayed based on the overdrive control reference parameters, the backlight control information, and the pixel signal statistical values comprises: determining a virtual partition set corresponding to each display screen partition based on the display screen partition position of each display screen partition indicated by the overdrive control reference parameters and the virtual partition position corresponding to each virtual partition;

calculating an initial pixel signal amplitude corresponding to each display screen partition based on the pixel signal statistical values of each virtual partition in each virtual partition set;

when the initial pixel signal amplitude is less than a preset amplitude threshold, predicting the pixel signal amplitude of each display screen partition when displaying the image frame to be displayed based on the initial pixel signal amplitude, the overdrive control reference parameters, and the backlight control information.

Optionally, the display overdrive control device further includes: a mapping table obtaining unit is configured for obtaining a preset pixel signal mapping table, where the pixel signal mapping table comprises a corresponding relationship between the pixel signal statistical values and pixel signal mapping function.

The amplitude prediction unit is configured for determining a target pixel signal mapping function corresponding to each pixel signal statistical value based on the pixel signal statistical values of each virtual partition in each virtual partition set and the pixel signal mapping table;

mapping each pixel signal statistical value through the target pixel signal mapping function to obtain a pixel signal mapping value of each virtual partition; and calculating the initial pixel signal amplitude corresponding to each display screen partition based on the pixel signal mapping value of each virtual partition.

Optionally, the pixel signal statistical values comprise the average pixel signal value. The amplitude prediction unit is configured for mapping each average pixel signal value through the target pixel signal mapping function to obtain the average pixel signal mapping value of each virtual partition;

calculating a sum of the average pixel signal mapping value of each virtual partition in each virtual partition set based on the average pixel signal mapping values of each virtual partition to obtain a pixel signal amplitude sum corresponding to each virtual partition set; and determining the number of partitions in each virtual partition set, and respectively calculating the quotient of the pixel signal amplitude sum corresponding to each virtual partition set and the number of partitions for each virtual partition set to obtain the initial pixel signal amplitude of the display screen partition corresponding to each virtual partition set.

Optionally, the overdrive control reference parameters comprise a maximum overdrive driving current. The amplitude prediction unit is configured for multiplying the initial pixel signal amplitude by the backlight control information to calculate a backlight pixel signal amplitude of the display screen partition;

performing a division operation on the backlight pixel signal amplitude and the maximum overdrive driving current to obtain the pixel signal amplitude of each display screen partition when displaying the image frame to be displayed.

Optionally, the pixel signal statistical values comprise a maximum pixel signal value. The display overdrive control device of the present disclosure further includes a maximum amplitude prediction unit is configured for predicting a maximum pixel signal amplitude of each display screen partition when displaying the image frame to be displayed based on the overdrive control reference parameters and the maximum pixel signal value.

The coefficient determination unit is configured for establishing an overdrive coefficient search index based on the maximum pixel signal amplitude and the pixel signal amplitude;

searching for the overdrive coefficient from the mapping relationship between the preset pixel signal amplitude and the reference overdrive coefficients based on the overdrive coefficient search index.

Optionally, the overdrive control reference parameters of each display screen partition comprise an overdrive duration reference, a minimum average signal amplitude, and a partition overdrive weight of each display screen partition.

The coefficient correction unit is configured for calculating the product of the overdrive duration reference, the minimum average signal amplitude, and the partition overdrive weight of each display screen partition to obtain a heat accumulation limit corresponding to each display screen partition;

comparing the partition heat accumulation value and the heat accumulation limit for each display screen partition;

for overheated display screen partitions with the partition heat accumulation value greater than the heat accumulation limit, reducing the overdrive coefficients of the overheated display screen partitions, so that the new partition heat accumulation value obtained when the overheated display screen partition performs overdrive display on the image frame to be displayed based on the reduced overdrive coefficient is not greater than the heat accumulation limit; and using the reduced overdrive coefficient of each overheated display screen partition as the target overdrive coefficient of each overheated display screen partition.

Optionally, the display overdrive control device of the present disclosure further includes an adjacent coefficient correction unit configured for at least reducing the overdrive coefficient of the adjacent display screen partitions that have a positional adjacency relationship with the overheated display screen partition based on the positional information of the overheated display screen partition;

using the reduced overdrive coefficient of each adjacent display screen partition as the target overdrive coefficient of each adjacent display screen partition.

Optionally, the overdrive control reference parameters of each display screen partition comprise an overheat protection time reference, a minimum average signal amplitude, and a partition overdrive protection weight of each display screen partition. The display overdrive control device of the present disclosure further includes an overheat protection unit 710 configured for calculating the product of the overheat protection time reference, the minimum average signal amplitude, and the partition overdrive protection weight of each display screen partition to obtain a heat protection threshold corresponding to each display screen partition;

detecting current real partition heat accumulation value of each display screen partition, and comparing the real partition heat accumulation value of each display screen partition with the heat protection threshold; and controlling the display screen partition not to perform overdrive display for the display screen partitions whose real partition heat accumulation value is not less than the heat protection threshold.

Optionally, the overdrive control reference parameters comprise a maximum overdrive driving current. The heat accumulation value prediction unit is configured for predicting a partition heat increment value of each display screen partition when displaying the image frame to be displayed based on the maximum overdrive driving current, the pixel signal amplitude, and the overdrive coefficient in the overdrive control reference parameters;

obtaining a historical heat accumulation value of each display screen partition; and calculating the partition heat accumulation value of each display screen partition when displaying the image frame to be displayed based on the historical heat accumulation value and the partition heat increment value of each display screen partition.

Optionally, the display overdrive control device of the present disclosure further includes a heat accumulation value updating unit is configured for detecting current real partition heat accumulation value of each display screen partition when displaying the image frame to be displayed;

using the real partition heat accumulation value as the new historical heat accumulation value of each display screen partition.

Optionally, the parameter acquisition unit is configured for obtaining the overdrive control reference parameters of a plurality of display screen partitions of the display device and the image frame to be displayed;

partitioning the image frame to be displayed based on the display screen partitions to obtain image blocks matching the display screen partitions;

obtaining the backlight control information based on a pixel signal processing of each image block;

obtaining the pixel signal statistical values of a plurality of virtual partitions of the image frame to be displayed.

Correspondingly, an embodiment of the present disclosure provides an electronic device comprising a processor and a memory storing computer-readable instructions executable by the processor to perform the steps in any of the display overdrive control methods provided in the embodiments of the present disclosure.

Correspondingly, an embodiment of the present disclosure provides a computer-readable storage medium storing computer-readable instructions executable by the processor to perform the steps in any of the display overdrive control methods provided in the embodiments of the present disclosure.

In addition, an embodiment of the present disclosure provides a computer procedure product comprising procedure and computer-readable instructions executable by the processor to perform the steps in any of the display overdrive control methods provided in the embodiments of the present disclosure.

Advantageous Effect of the Present Disclosure

Beneficial Effects beneficial effect: Embodiments of the present disclosure proposes a display overdrive control method, comprising: obtaining overdrive control reference parameters, backlight control information, and pixel signal statistical values of multiple virtual partitions of an image frame to be displayed for multiple display screen partitions of a display device; predicting a pixel signal amplitude of each display screen partition when displaying the image frame to be displayed based on the overdrive control reference parameters, the backlight control information, and the pixel signal statistical values; determining the overdrive coefficients corresponding to the pixel signal amplitude from the reference overdrive coefficients based on a mapping relationship between a preset pixel signal amplitude and the reference overdrive coefficients and the pixel signal amplitude; predicting a partition heat accumulation value of each display screen partition when displaying the image frame to be displayed based on the overdrive control reference parameters, the pixel signal amplitude, and the overdrive coefficients; performing a heat control correction on the overdrive coefficients of each display screen partition based on the partition heat accumulation value and the overdrive control reference parameters to obtain a target overdrive coefficient of each display screen partition; performing an overdrive control on the display device through the target overdrive coefficient corresponding to each display screen partition. In the embodiments of the present disclosure, the display screen of the display device is partitioned, and the heat accumulation status of each display screen partition is dynamically monitored to achieve dynamic control of the overdrive state of each display screen partition. Therefore, the overdrive duration can be improved, and the overdrive effect of the display device can be enhanced without changing the hardware structure of the display device.

BRIEF DESCRIPTION OF THE DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be acquired according to these drawings without creative labor.

Figure 1:
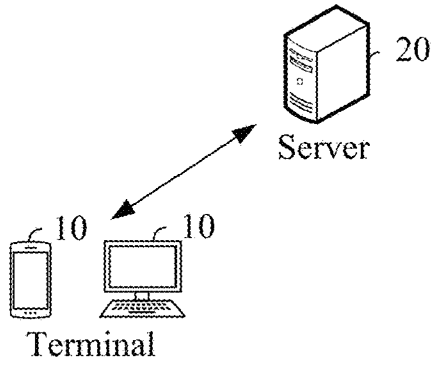

FIG. 1 is a schematic diagram of a display overdrive control method according to an embodiment of the present disclosure.

Figure 2:
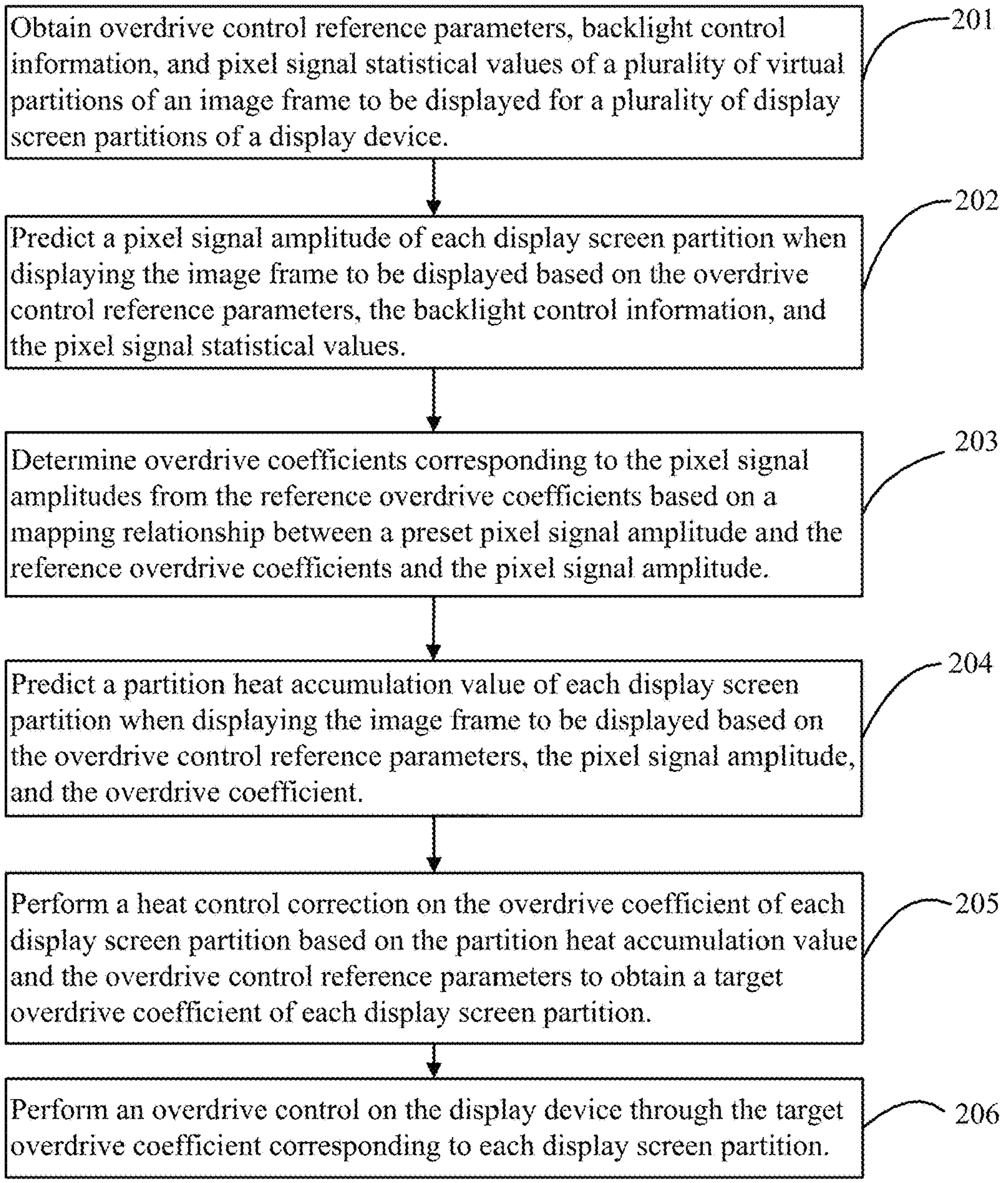

FIG. 2 is a flowchart of a display overdrive control method according to an embodiment of the present disclosure.

Figures 3, 4, 5:
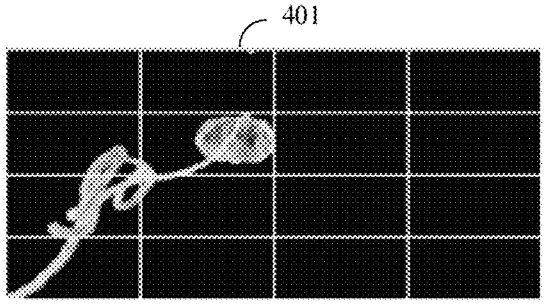

FIG. 3 is a schematic diagram of the display screen partition according to an embodiment of the present disclosure.

FIG. 4 is a schematic diagram of the correspondence between the backlight control information and the display screen partition according to an embodiment of the present disclosure.

FIG. 5 is a schematic diagram of a logical calculation according to an embodiment of the present disclosure.

Figure 6:
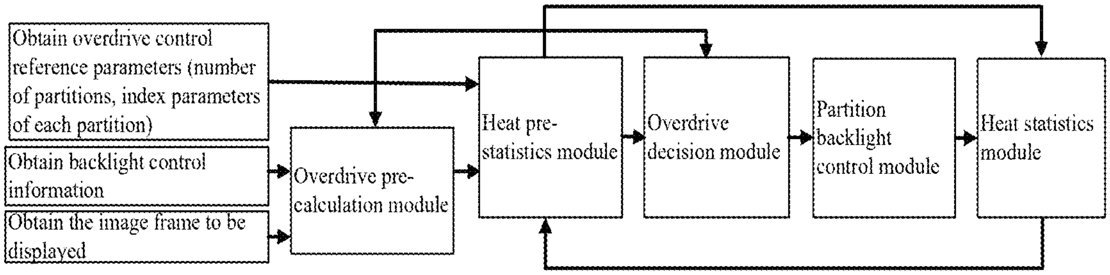

FIG. 6 is a flowchart of a display overdrive control method according to an embodiment of the present disclosure.

Figure 7:
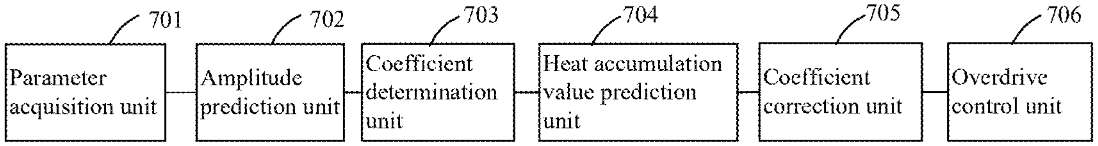

FIG. 7 is a schematic diagram of a display overdrive control device according to an embodiment of the present disclosure.

Figure 8:
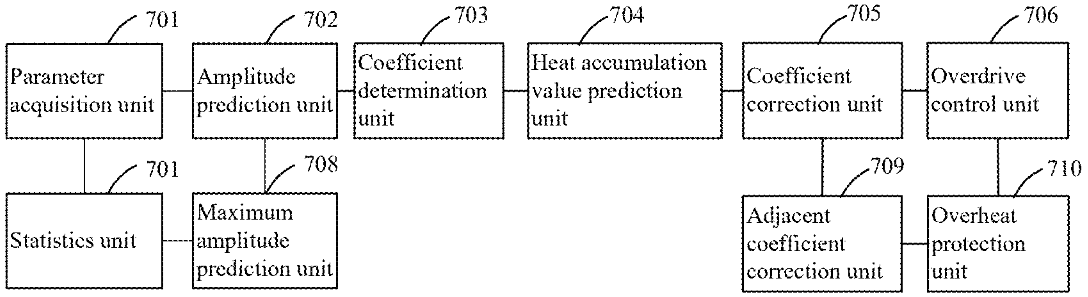

FIG. 8 is another schematic diagram of the display overdrive control device according to an embodiment of the present disclosure.

Figure 9:
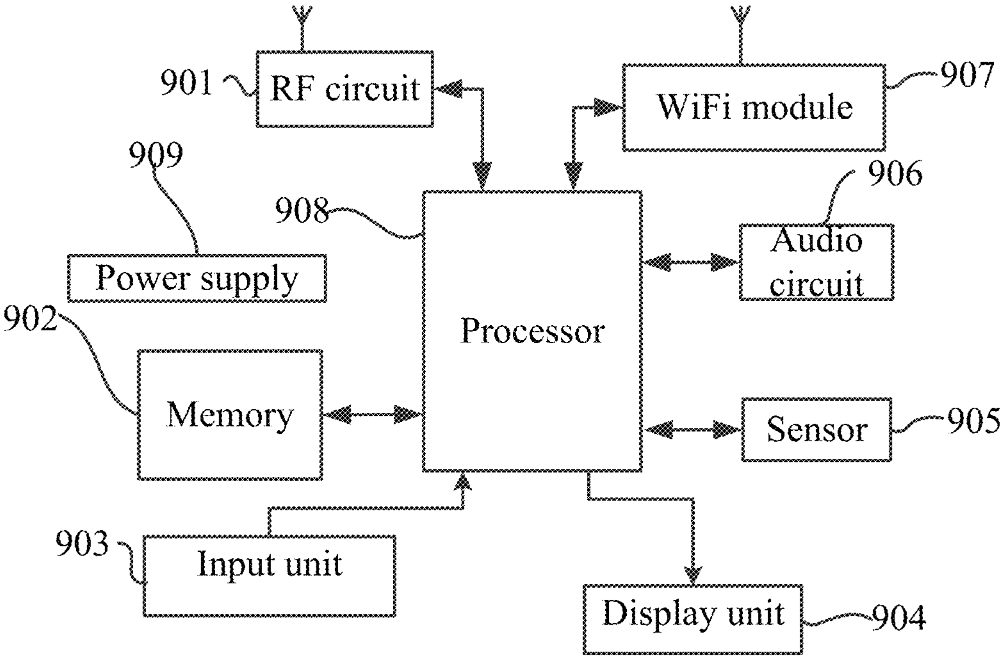

FIG. 9 is a schematic diagram of an electronic device according to an embodiment of the present disclosure.

DETAILED DESCRIPTION OF THE PRESENT DISCLOSURE

Embodiments of Present Disclosure

The technical solution in the embodiment of the present disclosure will be clearly and completely described below in conjunction with the accompanying drawings in the embodiment of the present disclosure. Obviously, the described embodiments are only some embodiments of the present disclosure, not all embodiments. Based on the embodiments in the present disclosure, all other embodiments obtained by a person skilled in the art without creative work fall within the scope of protection of the present disclosure.

An embodiment of the present disclosure provides a display overdrive control method, device, electronic device and computer-readable storage medium. Specifically, an embodiment of the present disclosure provides a display overdrive control method suitable for displaying an overdrive control device, whereas the display overdrive control device may be integrated in an electronic device.

The electronic device may be a terminal and other equipment, including but not limited to mobile terminals and fixed terminals. The mobile terminals include but not limited to smart phones, smart watches, tablet computers, laptops, smart cars, etc., wherein, fixed terminals include but are not limited to desktop computers, smart televisions (TVs).

The electronic device can also be a server and other equipment. The server can be an independent physical server, or a server cluster or distributed system composed of multiple physical servers. The server can provide but is not limited to cloud services, cloud databases, cloud computing, cloud functions, cloud storage, network services, cloud communications, middleware services, domain name services, security services, Content Delivery Network (CDN), and basic cloud computing services such as big data and artificial intelligence platforms.

The display overdrive control method of the embodiment of the present disclosure can be realized by the server, and can also be jointly realized by the terminal and the server.

The following takes the terminal and server to jointly implement the display overdrive control method as an example to illustrate the method.

As shown in FIG. 1, the display overdrive control system of an embodiment of the present disclosure comprises a display device 10 and a server 20. The terminal 10 and the server 20 can be connected through a network, such as a wired or wireless network. The server 20 can exist as an electronic device that sends data to be displayed to the terminal 10.

The server 20 can be used to send image frames to be displayed to the terminal 10.

The terminal 10 may obtain overdrive control reference parameters, backlight control information, and pixel signal statistical values of a plurality of virtual partitions of an image frame to be displayed for a plurality of display screen partitions of a display device; predict a pixel signal amplitude of each display screen partition when displaying the image frame to be displayed based on the overdrive control reference parameters, the backlight control information, and the pixel signal statistical values; determine overdrive coefficients corresponding to the pixel signal amplitudes from the reference overdrive coefficients based on a mapping relationship between a preset pixel signal amplitude and the reference overdrive coefficients and the pixel signal amplitude; predict a partition heat accumulation value of each display screen partition when displaying the image frame to be displayed based on the overdrive control reference parameters, the pixel signal amplitude, and the overdrive coefficient; perform a heat control correction on the overdrive coefficients of each display screen partition based on the partition heat accumulation value and the overdrive control reference parameters to obtain a target overdrive coefficient of each display screen partition; and perform an overdrive control on the display device through the target overdrive coefficient corresponding to each display screen partition.

The terminal 10 can perform an overdrive control on the display device through a target overdrive coefficient corresponding to each display screen partition when displaying the image frame to be displayed.

Understandably, in some embodiments, the data to be displayed provided by the server 20, such as the image frame to be displayed, can also be directly stored in the terminal 10 and the embodiment of the present disclosure is not limited thereto.

In other embodiments, the step of determining the target overdrive coefficient of each display screen partition performed by the terminal 10 can also be performed by the server 20. For example, after obtaining the target overdrive coefficient of each display screen partition, the server 20 can send the target overdrive coefficient to the terminal 10, so that the terminal 10 can perform the overdrive control on the display device through the target overdrive coefficient corresponding to each display screen partition.

The description order of the following embodiments does not limit the preferred order of the embodiments.

The embodiments of the present disclosure will be described from the perspective of the display overdrive control device, which can be specifically integrated into a server and/or terminal.

As shown in FIG. 2, the flow of the display overdrive control method shown in this embodiment is as follows:

201. Obtain the overdrive control reference parameters, backlight control information, and pixel signal statistical values of multiple virtual partitions of an image frame to be displayed for multiple display screen partitions of the display device.

The display device is an electronic device with a display function, such as a television, a tablet, a laptop, a smartphone, a smartwatch, a smart vehicle, etc.

Specifically, the display screen partition refers to dividing the display screen area of the display device to obtain the display range. As shown in FIG. 3, a display screen area can be divided into 4 rows and 4 columns, resulting in a total of 16 display screen partitions. Alternatively, for display screens manufactured using OLED (organic light-emitting diode) technology, the pixel positions corresponding to the image frame to be displayed in the display screen area can be used as display screen partitions. The embodiments of the present disclosure do not limit the partitioning method and the number of partitions of the display screen.

The overdrive control reference parameters are parameters set according to the display capabilities of the display device. For example, the overdrive control reference parameters can include, but are not limited to, the minimum average pixel signal amplitude, minimum driving current, maximum driving current, maximum overdrive driving current, overdrive duration reference, overheat protection time reference, and other sub-parameters.

Understandably, one overdrive control reference parameter can correspond to one display screen partition. Alternatively, one overdrive control reference parameter can correspond to multiple or all display screen partitions. In the case of multiple overdrive control reference parameters, the overdrive control reference parameters of each display screen partition can be the same or have at least one different sub-parameter.

When one overdrive control reference parameter corresponds to multiple display screen partitions, the overdrive control reference parameter can describe the positions, quantities, etc., of its corresponding display screen partitions. For example, the overdrive control reference parameter may include the number of horizontal partitions and the number of vertical partitions of the display screen area, or the overdrive control reference parameter may include the position or number of its corresponding display screen partitions.

The backlight control information can be information calculated based on the image content corresponding to the image frame to be displayed in the display screen partition, used for backlight control when displaying the image frame to be displayed. The backlight control information corresponding to different display screen partitions may be the same or different.

In practical applications, the image frame to be displayed can be divided into blocks, and different coefficients (brightness intensity of image blocks or LED blocks) can be used to adjust the backlight for different blocks to achieve high contrast, i.e., making bright areas brighter and dark areas darker. The backlight control information is the relevant parameter information used when adjusting the backlight. That is, step 201 can specifically include:

- Obtaining the overdrive control reference parameters of multiple display screen partitions of the display device and the image frame to be displayed;
- Partitioning the image frame to be displayed based on the display screen partitions to obtain image blocks matching the display screen partitions;
- Obtaining backlight control information based on the pixel signal processing of each image block;
- Obtaining the pixel signal statistical values of multiple virtual partitions of the image frame to be displayed.

For example, when the display device has 16 display screen partitions, correspondingly, when partitioning the image frame to be displayed, the image frame to be displayed can be divided into 16 image blocks corresponding to the display screen partitions as shown in 401 of FIG. 4.

Specifically, the calculation of the image content corresponding to the image frame to be displayed in the display screen partitions in 401 of FIG. 4 can obtain the backlight control information of each display screen partition as shown in 402 of FIG. 4.

The image frame to be displayed can be an image composed of information to be displayed on the display screen. For example, the image frame to be displayed can be a picture or a video frame of a video to be played on the display screen, or the image frame to be displayed can be an image frame composed of an application interface and the default background of the display screen, etc.

Specifically, a virtual partition refers to the area obtained by dividing the image frame to be displayed. It can be understood that the division of virtual partitions does not actually involve cutting the image frame to be displayed into several sub-images, but rather treating the area composed of certain pixel points in the image frame to be displayed as a virtual partition.

Optionally, the number of virtual partitions can be greater than the number of display screen partitions.

Optionally, the division of virtual partitions can be uniform. For example, the division of virtual partitions can be to evenly divide the entire image frame to be displayed into m rows and n columns. The specific values of m and n can be preset by technicians or the specific values of m and n can be automatically adjusted based on the content of different image frames to be displayed during the division of virtual partitions.

For content-rich image frames to be displayed (for example, object detection can be performed on the image frame to be displayed, and the image frame to be displayed where object detection results in a number of objects greater than a preset threshold can be considered content-rich), the values of m and n can be set larger. For simple content image frames to be displayed (for example, image frames to be displayed where the proportion of continuous solid color areas is greater than a preset area threshold can be considered simple content), the values of m and n can be appropriately reduced.

For example, the division of virtual partitions can be to evenly divide the entire image frame to be displayed into 108 rows and 192 columns. For an image frame to be displayed at a 4K (3840×2160) resolution, each virtual partition includes 20×20, a total of 400 pixels.

Optionally, to further leverage certain hardware advantages of the display device, the image frame to be displayed can also be divided into non-uniform virtual partitions. Specifically, the step "obtaining the image frame to be displayed, and performing partition processing on the image frame to be displayed to obtain multiple virtual partitions corresponding to the image frame to be displayed" can include:

- Obtaining the image frame to be displayed;
- Performing a non-uniform partition processing on the image frame to be displayed based on the pixel signals corresponding to each pixel point in the image frame to be displayed to obtain multiple virtual partitions corresponding to the image frame to be displayed.

Among the multiple virtual partitions obtained through non-uniform partition processing, at least two virtual partitions have different numbers of corresponding pixel points.

When performing the non-uniform partition processing, the number of virtual partitions for each area can be determined based on the image content of the area corresponding to each display screen partition in the image frame to be displayed. For example, an area corresponding to a specific display screen partition in the image frame to be displayed can be divided into h rows and t columns. For content-rich areas (for example, object detection can be performed on the areas, and areas where object detection results in a number of objects greater than a preset threshold can be considered content-rich), the values of h and t can be set larger. For simple content areas (for example, areas where the proportion of continuous solid color parts is greater than a preset area threshold can be considered simple content), the values of h and t can be appropriately reduced.

Optionally, the pixel signal statistical values can be pre-calculated for the image frame to be displayed by the display device or a remote device such as a server connected to the display device before performing overdrive control based on the image frame to be displayed. That is, before step 201, the display overdrive control method provided by the embodiments of the present disclosure can further include:

Obtaining the image frame to be displayed, and performing partition processing on the image frame to be displayed to obtain multiple virtual partitions corresponding to the image frame to be displayed;

Calculating an average pixel signal value and the maximum pixel signal value of each virtual partition as pixel signal statistical values based on the pixel signals corresponding to each pixel point in each virtual partition.

The pixel signal statistical values are data obtained through a statistical processing based on the pixel signals corresponding to each pixel point in each virtual partition.

The pixel signal can be understood as the pixel color signal corresponding to each pixel point. The pixel signal can be represented in modes such as RGB color space, YUV color space, YIQ color space, and so on.

Pre-calculating the pixel signal statistical values can speed up the overdrive control of the display device based on the image frame to be displayed and reduce the computational pressure on the display device. For example, when playing a video, the display device can pre-calculate and store the pixel signal statistical values of some image frames to be displayed that have not yet been displayed, so that the pixel signal statistical values of the image frame to be displayed can be quickly obtained when needed.

Alternatively, the display device can send a request to obtain the pixel signal statistical values to a remote device when the pixel signal statistical values of the image frame to be displayed are needed, triggering the remote device to send the pixel signal statistical values to the display device.

When the computational resources of the display device allow, the pixel signal statistical values can also be calculated in real-time by the display device when performing the overdrive control based on the image frame to be displayed. The embodiments of the present disclosure are not limited thereto.

Optionally, an average pixel signal value in the pixel signal statistical values can be obtained by calculating the average value of the pixel signals of each pixel point in the virtual partition, and the maximum pixel signal value in the pixel signal statistical values can be obtained by taking the maximum value of the pixel signals of each pixel point in the virtual partition.

Taking each virtual partition including 400 pixel points as an example, the average pixel signal value can be calculated as follows:

$$\text{apl\_i} = \text{average}(s1, s2, \ldots, s400) = (s1 + s2 + \ldots + s400)/400,$$

and the maximum pixel signal value can be calculated as follows:

$$\text{a\_max\_i} = \max(s1, s2, \ldots, s400),$$

where apl_i is the average pixel signal value of the (i)th virtual partition, and a_max_i is the maximum pixel signal value of the (i)th virtual partition. s1、s2, . . . , s400 respectively represent the pixel signals of the 1st to the 400th pixel points in the (i)th virtual partition.

202. Predict the pixel signal amplitude of each display screen partition when displaying the image frame to be displayed based on the overdrive control reference parameters, the backlight control information, and the pixel signal statistical values.

The amplitude of the pixel signal of the display screen partition when displaying the image frame to be displayed may affect the overdrive effect.

In some embodiments, when an initial pixel signal amplitude predicted based on the overdrive control reference parameters, the backlight control information, and the pixel signal statistical values exceeds an amplitude threshold of the display screen partition, the initial pixel signal amplitude can be amplified to achieve further overdrive. The step 202 can include:

determining a virtual partition set corresponding to each display screen partition based on the display screen partition position of each display screen partition indicated by the overdrive control reference parameters and the virtual partition position corresponding to each virtual partition;

calculating the initial pixel signal amplitude corresponding to each display screen partition based on the pixel signal statistical values of each virtual partition in each virtual partition set; and when the initial pixel signal amplitude is less than a preset amplitude threshold, predicting the pixel signal amplitude of each display screen partition when displaying the image frame to be displayed based on the initial pixel signal amplitude, the overdrive control reference parameters, and the backlight control information.

The initial pixel signal amplitude is the amplitude that the display screen partition can achieve when displaying the image frame to be displayed without performing the overdrive processing on the image frame to be displayed.

If the initial pixel signal amplitude is small, it indicates that the display screen partition can undergo overdrive processing. At this time, an amplified initial pixel signal amplitude can be calculated based on the backlight control information for backlight processing of the display screen partition.

Specifically, the overdrive control reference parameters may include the maximum overdrive driving current. The step "predicting the pixel signal amplitude of each display screen partition when displaying the image frame to be displayed based on the initial pixel signal amplitude, the overdrive control reference parameters, and the backlight control information" can include:

Multiplying the initial pixel signal amplitude by the backlight control information to calculate the backlight pixel signal amplitude of the display screen partition; and Performing a division operation on the backlight pixel signal amplitude and the maximum overdrive driving current to obtain the pixel signal amplitude of each display screen partition when displaying the image frame to be displayed.

The calculation process of the pixel signal amplitude can be represented by the following formula:

$$\text{apl\_k} = \text{apl\_j} * \text{Bi\_j/i\_boost},$$

where apl_k is the pixel signal amplitude of a display screen partition, apl_j is the initial pixel signal amplitude of the display screen partition, Bi_j is the backlight control information of the display screen partition, and i_boost is the maximum overdrive driving current of the display screen partition.

In other embodiments, when the initial pixel signal amplitude of a display screen partition is not less than the amplitude threshold, it can be considered that the display screen partition does not have the conditions for further overdrive when displaying the image frame to be displayed. In this case, the initial pixel signal amplitude can be left unprocessed.

In other words, it can be determined whether the apl_j of a display screen partition is greater than apl_low (the amplitude threshold). When it is greater, the display screen partition does not have the conditions for further overdrive, and it directly moves to the next display screen partition; and when it is smaller, a new apl_k is calculated.

Since the number of virtual partitions is much greater than the number of display screen partitions, there needs to be a certain mapping relationship between the virtual partitions and the display screen partitions. This mapping relationship mainly depends on the division method of the virtual partitions.

If the virtual partitions are obtained by uniform division, the mapping relationship can be the correspondence between the virtual partitions and the display screen partitions through spatial positions. For example, the division of virtual partitions can be to evenly divide the entire image frame to be displayed into 108 rows and 192 columns, while the display screen partitions are 16. At this time, one display screen partition can correspond to 27*48, a total of 1296 virtual partitions.

If the virtual partitions are obtained by non-uniform division, the mapping relationship can also be the correspondence between the virtual partitions and the display screen partitions only through spatial positions. For example, a display screen partition 1 can correspond to 4 virtual partitions, and a display screen partition 2 can correspond to 16 virtual partitions.

Furthermore, the pixel signal statistical values of multiple virtual partitions corresponding to the display screen partitions can be converted using the respective calculation logic based on the different display screen partitions. Finally, each display screen partition has a converted pixel signal statistical value corresponding to it.

Before the step "calculating the initial pixel signal amplitude corresponding to each display screen partition based on the pixel signal statistical values of each virtual partition in each virtual partition set", the display overdrive control method provided by the embodiments of the present disclosure further includes:

Obtaining a preset pixel signal mapping table, wherein the pixel signal mapping table includes the corresponding relationship between the pixel signal statistical values and the pixel signal mapping functions.

The pixel signal mapping table can be pre-stored in the display device.

In the embodiments of the present disclosure, the pixel signal mapping table can be in the form of a LUT (Look-Up-Table). Essentially, a LUT is a RAM. It writes data into the RAM in advance, and each time a signal is input, it is equivalent to input an address to look up the table, find the content corresponding to the address, and then output it.

The pixel signal mapping function can transform the pixel signal statistical values into another corresponding mapping value through certain transformations such as thresholding, inversion, binarization, contrast adjustment, linear transformation, etc.

Correspondingly, the step "calculating the initial pixel signal amplitude corresponding to each display screen partition based on the pixel signal statistical values of each virtual partition in each virtual partition set" can include:

Determining a target pixel signal mapping function corresponding to each pixel signal statistical value based on the pixel signal statistical values of each virtual partition in each virtual partition set and the pixel signal mapping table;

Mapping each pixel signal statistical value through the target pixel signal mapping function to obtain a pixel signal mapping value of each virtual partition;

Calculating the initial pixel signal amplitude corresponding to each display screen partition based on the pixel signal mapping values of each virtual partition.

FIG. 5 is a schematic diagram of a pixel signal mapping table, wherein each number in the table can represent the mapping of the pixel signal statistical values of the corresponding virtual partition by that multiple.

Optionally, the pixel signal statistical values include an average pixel signal value and the step "mapping each pixel signal statistical value through the target pixel signal mapping function to obtain the pixel signal mapping value of each virtual partition" can specifically include:

Mapping each average pixel signal value through the target pixel signal mapping function to obtain an average pixel signal mapping value of each virtual partition.

Correspondingly, the step "calculating the initial pixel signal amplitude corresponding to each display screen partition based on the pixel signal mapping values of each virtual partition" can include:

Calculating a sum of the average pixel signal mapping values of each virtual partition in each virtual partition set based on the average pixel signal mapping values of each virtual partition to obtain a pixel signal amplitude sum corresponding to each virtual partition set;

Determining the number of virtual partitions in each virtual partition set, and respectively calculating the quotient of the pixel signal amplitude sum corresponding to each virtual partition set and the number of partitions for each virtual partition set to obtain the initial pixel signal amplitude of the display screen partition corresponding to each virtual partition set.

Taking FIG. 5 as the pixel signal mapping table and a display screen partition corresponding to 27*48, a total of 1296 virtual partitions as an example, the initial pixel signal amplitude of the display screen partition can be calculated and obtained through the following process:

$$\begin{aligned}apl\_j = (&apl\_1 * L\_LUT(1, 1, 1) + \\ &apl\_2 * L\_LUT(1, 2, 1) + \ldots + apl\_((a-1)*27+b)* \\ &L\_LUT(a, b, 1) + \ldots + apl\_(48*27)*L\_LUT(48, 27, 1))/(48*27);\end{aligned}$$

where apl_j is the initial pixel signal amplitude of the display screen partition, L_LUT is the pixel signal mapping table in FIG. 5, L_LUT(1,1,1) represents the first virtual partition in the display screen partition, and 48*27 is the number of virtual partitions corresponding to the display screen partition.

203. Determine the overdrive coefficients corresponding to the pixel signal amplitude from the reference overdrive coefficients based on a mapping relationship between the preset pixel signal amplitude and the reference overdrive coefficients and the pixel signal amplitude.

In some embodiments, the overdrive coefficients can be determined solely based on the pixel signal amplitude, such as the mapping relationship between the pixel signal amplitude and the reference overdrive coefficients includes only the reference overdrive coefficient corresponding to each pixel signal amplitude.

In other embodiments, in order to improve the accuracy of the overdrive coefficients, the overdrive coefficients can be determined based on the pixel signal amplitude and the maximum pixel signal amplitude. At this time, the pixel signal statistical values include the maximum pixel signal value and before step 203, the display overdrive control method provided by the embodiments of the present disclosure further includes:

Predicting the maximum pixel signal amplitude of each display screen partition when displaying the image frame to be displayed based on the overdrive control reference parameters and the maximum pixel signal value.

Correspondingly, the step "determining the overdrive coefficients corresponding to the pixel signal amplitude from the reference overdrive coefficients based on the mapping relationship between the preset pixel signal amplitude and the reference overdrive coefficients and the pixel signal amplitude" can specifically include:

Establishing an overdrive coefficient search index based on the maximum pixel signal amplitude and the pixel signal amplitude;

Searching for the overdrive coefficients from the mapping relationship between the preset pixel signal amplitude and the reference overdrive coefficients based on the overdrive coefficient search index.

That is, in the embodiments of the present disclosure, the pixel signal amplitude apl_k and the maximum pixel signal amplitude a_max_j can be used as index values, substituted into the mapping relationship between the preset pixel signal amplitude and the reference overdrive coefficients to find the overdrive coefficient A_k, which is the overdrive coefficient of the corresponding display screen partition.

The step "predicting the maximum pixel signal amplitude of each display screen partition when displaying the image frame to be displayed based on the overdrive control reference parameters and the maximum pixel signal value" can specifically include:

Determining a virtual partition set corresponding to each display screen partition based on a display screen partition position of each display screen partition indicated by the overdrive control reference parameters and the virtual partition position corresponding to each virtual partition;

Calculating the maximum pixel signal amplitude corresponding to each display screen partition based on the maximum pixel signal value of each virtual partition in each virtual partition set.

The process of determining the virtual partitions corresponding to the display screen partitions is similar to the process of calculating the initial pixel signal amplitude described earlier, and will not be repeated here in the embodiments of the present disclosure.

The step "calculating the maximum pixel signal amplitude corresponding to each display screen partition based on the maximum pixel signal value of each virtual partition in each virtual partition set" includes:

Determining a target pixel signal mapping function corresponding to each maximum pixel signal value based on the maximum pixel signal value of each virtual partition in each virtual partition set and the pixel signal mapping table;

Mapping each maximum pixel signal value through the target pixel signal mapping function to obtain the maximum pixel signal mapping value of each virtual partition;

Calculating the maximum pixel signal amplitude corresponding to each display screen partition based on the maximum pixel signal mapping values of each virtual partition.

Specifically, the pixel signal mapping table can include the corresponding relationship between the average pixel signal value, the maximum pixel signal value, and the pixel signal mapping function.

In the embodiments of the present disclosure, the calculation process of the maximum pixel signal mapping value can be performed simultaneously with the calculation process of the initial pixel signal amplitude, or it can be performed non-simultaneously. The embodiments of the present disclosure are not limited thereto.

Taking FIG. 5 as the pixel signal mapping table and a display screen partition corresponding to 27*48, a total of 1296 virtual partitions as an example, the maximum pixel signal amplitude of the display screen partition can be calculated and obtained through the following process:

$$a\_max\_j = (a\_max\_1 * L\_LUT(1, 1, 1) + a\_max\_2 * L\_LUT(1, 2, 1) + \ldots + a\_max\_((a-1)*27+b) * L\_LUT(a, b, 1) + \ldots + a\_max\_(48*27) * L\_LUT(48, 27, 1))/(48*27);$$

where a_max_j is the maximum pixel signal amplitude of the display screen partition, L_LUT is the pixel signal mapping table in FIG. 5, L_LUT(1,1,1) represents the first virtual partition in the display screen partition, and 48*27 is the number of virtual partitions corresponding to the display screen partition.

204. Predict a partition heat accumulation value of each display screen partition when displaying the image frame to be displayed based on the overdrive control reference parameters, the pixel signal amplitude, and the overdrive coefficients.

The display device may generate a certain amount of heat during the process of displaying images. The partition heat accumulation value of each partition can measure the heat accumulated by each display screen partition from the start of operation to the display of the image frame to be displayed.

Specifically, the partition heat accumulation value of each partition can be obtained by summing the heat accumulated during the historical operation process and the heat generated during the process of displaying the image frame to be displayed. That is, the overdrive control reference parameters can include the maximum overdrive driving current. The step 204 can include:

Predicting a heat increment value of each display screen partition when displaying the image frame to be displayed based on the maximum overdrive driving current, the pixel signal amplitude, and the overdrive coefficients in the overdrive control reference parameters;

Obtaining a historical heat accumulation value of each display screen partition;

Calculating the partition heat accumulation value of each display screen partition when displaying the image frame to be displayed based on the historical heat accumulation value and the heat increment value of each display screen partition.

The heat increment value of each display screen partition can be calculated using the following formula:

$$P\_k = apl\_k * i\_boost * A\_k,$$

where P_k is the heat increment value of a display screen partition, apl_k is the pixel signal amplitude of the display screen partition, i_boost is the maximum overdrive driving current of the display screen partition, and A_k is the overdrive coefficient of the display screen partition.

The historical heat accumulation value can be the heat accumulated during the historical operation process of each display screen partition.

In some embodiments, current partition heat accumulation value of each display screen partition after displaying the image frame to be displayed can be used as a new historical heat accumulation value. That is, the display overdrive control method provided by the embodiments of the present disclosure further includes:

Detecting current real partition heat accumulation value of each display screen partition when displaying the image frame to be displayed;

Using the real partition heat accumulation value as a new historical heat accumulation value of each display screen partition.

By updating the historical heat accumulation value, the accuracy of heat monitoring can be improved.

Alternatively, the historical heat accumulation value can also be the current remaining heat that has not dissipated in the display screen partition. That is, the step "obtaining the historical heat accumulation value of each display screen partition" can include:

Obtaining a historical heat generation value of each display screen partition;

Detecting a historical dissipated heat of each display screen partition, and calculating the historical heat accumulation value of each display screen partition based on the historical heat generation value and the historical dissipated heat.

The historical dissipated heat can be calculated and obtained by measuring with temperature sensors on the display screen, or it can be estimated and obtained based on the temperature of the environment around the display screen and the temperature data of the display screen. The embodiments of the present disclosure do not limit the method of obtaining the historical dissipated heat.

205. Perform a heat control correction on the overdrive coefficients of each display screen partition based on the partition heat accumulation value and the overdrive control reference parameters to obtain a target overdrive coefficient of each display screen partition.

In the embodiments of the present disclosure, the heat control correction of the overdrive coefficient can include amplifying or reducing the overdrive coefficient to control the heat generated during the overdrive display process.

If using the current overdrive coefficient for overdrive display may cause the display screen partition to overheat, the overdrive coefficient can be reduced to avoid overheating and protect the display screen.

If using the current overdrive coefficient for overdrive display does not exceed the heat tolerance of the display screen partition, the overdrive coefficient can be amplified to enhance the overdrive display effect, such as entering the overdrive state earlier, extending the overdrive time, increasing the overdrive voltage, etc.

Optionally, the overdrive control reference parameters of each display screen partition may include an overdrive duration reference, the minimum average signal amplitude, and a partition overdrive weight of each display screen partition, and the step 205 can specifically include:

For each display screen partition, calculating the product of the overdrive duration reference, the minimum average signal amplitude, and the partition overdrive weight of each display screen partition to obtain a heat accumulation limit corresponding to each display screen partition;

Comparing the partition heat accumulation value with the heat accumulation limit for each display screen partition;

For overheated display screen partitions with the partition heat accumulation value greater than the heat accumulation limit, reducing the overdrive coefficients of the overheated display screen partitions, so that the new partition heat accumulation value obtained when the overheated display screen partition performs overdrive display on the image frame to be displayed based on the reduced overdrive coefficient is not greater than the heat accumulation limit;

Using the reduced overdrive coefficient of each overheated display screen partition as the target overdrive coefficient of each overheated display screen partition.

The overheated display screen partition is the display screen partition whose partition heat accumulation value calculated when performing overdrive display on the image frame to be displayed with the overdrive coefficient exceeds the heat accumulation limit.

The heat accumulation limit is the maximum heat that the display screen partition can withstand. The heat accumulation limit can be calculated using the following formula:

$$P1(k) = apl\_low * local\_t0(k) * t0,$$

where P1($k$) is the heat accumulation limit of the display screen partition, apl_low is the minimum average signal amplitude of the display screen partition, local_t0($k$) is the partition overdrive weight of the display screen partition, and t0 is the overdrive duration reference of the display screen partition.

For example, it can be determined whether the PA_k of the display screen partition exceeds its heat accumulation limit P1($k$). If PA_k exceeds P1($k$), the current overdrive coefficient A_k of the current display screen partition (i.e., the overheated display screen partition) is reduced to obtain the target overdrive coefficient, so that the actual partition heat accumulation value of the overheated display screen partition when performing overdrive display on the image frame to be displayed with the target overdrive coefficient does not exceed the heat accumulation limit.

Alternatively, the overdrive coefficient A_k of the overheated display screen partition can be directly set to Bi_j/i_boost, which stops the overdrive of the overheated display screen partition.

In some embodiments, in order to prevent the heat generated by the display screen partitions adjacent to the overheated display screen partition from affecting the overheated display screen partition through heat transfer and other ways, the overdrive coefficients of the adjacent display screen partitions can also be reduced in addition to reducing the overdrive coefficient of the overheated display screen partition.

The display overdrive control method provided by the embodiments of the present disclosure can further include:

At least reducing the overdrive coefficients of the adjacent display screen partitions that have a positional adjacency relationship with the overheated display screen partition based on positional information of the overheated display screen partition;

Using the reduced overdrive coefficient of each adjacent display screen partition as the target overdrive coefficient of each adjacent display screen partition.

The specific processing of the overdrive coefficient of the adjacent display screen partitions can be determined based on the predicted heat accumulation status of the overheated display screen partition.

For example, if PA_k exceeds P1(*k*) but is less than 1.2 times of the upper limit P1(*k*), the overdrive coefficient of the adjacent display screen partitions can be reduced to 0.95 times of the original value. If the reduced overdrive coefficient that reduces to 0.95 times of the original value is less than Bi_j/i_boost, the reduced overdrive coefficient of the adjacent display screen partitions is set to Bi_j/i_boost.

If PA_k exceeds 1.2 times of P1(*k*), the overdrive coefficients of the adjacent display screen partitions or all display screen partitions can be directly reduced to Bi_j/i_boost.

Optionally, the overdrive coefficients of the overdrive display screen partitions whose partition heat accumulation value does not exceed the heat accumulation limit can be left unprocessed, and their overdrive coefficients can be directly used as the target overdrive coefficients.

Alternatively, the overdrive coefficient of each overdrive display screen partition whose partition heat accumulation value does not exceed the heat accumulation limit can be amplified, so that the new partition heat accumulation value obtained when the overdrive display screen partition performs overdrive display on the image frame to be displayed with the amplified overdrive coefficient does not exceed the heat accumulation limit.

Furthermore, use the amplified overdrive coefficient of each overheated display screen partition as the target overdrive coefficient of each overheated display screen partition.

206. Perform an overdrive control on the display device through the target overdrive coefficient corresponding to each display screen partition.

To prevent damage to the display device caused by overheating of the display screen, the display screen will enter an overheat protection state when the accumulated heat reaches a certain threshold. Optionally, the overdrive control reference parameters of each display screen partition include an overheat protection time reference, the minimum average signal amplitude, and a partition overdrive protection weight of each display screen partition. The display overdrive control method provided by the embodiments of the present disclosure can further include:

For each display screen partition, calculating the product of the overheat protection time reference, the minimum average signal amplitude, and the partition overdrive protection weight of each display screen partition to obtain a heat protection threshold corresponding to each display screen partition;

Detecting current real partition heat accumulation value of each display screen partition, and comparing the real partition heat accumulation value of each display screen partition with its heat protection threshold;

Controlling the display screen partition not to perform overdrive display for the display screen partitions whose real partition heat accumulation value is not less than the heat protection threshold.

Understandably, after entering the overheat protection, a certain amount of time is needed before re-entering the overdrive state. Under overheat protection, the difference between the already accumulated heat and the upper limit of heat that can be accumulated (i.e., the heat protection threshold) needs to reach a certain range before exiting.

Specifically, the heat protection threshold P2(*k*) can be calculated using the following formula:

$$P2(k) = \text{apl\_low} * \text{local\_t1}(k) * t1,$$

where apl_low is the minimum average signal amplitude of the display screen partition, local_t1(*k*) is the partition overdrive protection weight of the display screen partition, and t1 is the overheat protection time reference of the display screen partition.

As shown in FIG. 6, the display device obtains the overdrive control reference parameters (including the number of display screen partitions, the index parameters of each display screen partition, etc.), the backlight control information, and the image frame to be displayed. The overdrive pre-calculation module calculates a set of overdrive coefficients based on the overdrive control reference parameters, the backlight control information, and the signal amplitude statistics of the image frame to be displayed.

The heat pre-statistics module performs a pre-statistics of the heat accumulation status of each display screen partition based on the overdrive coefficients calculated by the overdrive pre-calculation module and the overdrive control reference parameters, and outputs a set of partition heat accumulation values and outputs a set of partition heat increment values.

The overdrive decision module further corrects the overdrive coefficients of each display screen partition based on the partition partition heat accumulation values and the overdrive control reference parameters, and outputs the target overdrive coefficient of each display screen partition. The partition backlight control module performs actual backlight control based on the target overdrive coefficient of each display screen partition.

Optionally, current image frame to be displayed can be compared with the already displayed image frames that have undergone overdrive display for similarity. If the similarity between the image frame to be displayed and the already displayed image frame is greater than a preset similarity threshold, the target overdrive coefficient of each display screen partition when displaying the already displayed image frame can be directly obtained, and an overdrive control can be performed on the image frame to be displayed based on the target overdrive coefficient. The display overdrive control method provided by the embodiments of the present disclosure can further include the following steps:

Obtaining the image frame to be displayed and the already displayed image frames of the display device;

Performing a similarity matching between the image frame to be displayed and the displayed image frames to obtain an image similarity between the image frame to be displayed and each displayed image frame;

If the image similarity is greater than a preset similarity threshold, obtaining the target overdrive coefficient of each display screen partition when displaying the displayed image frame corresponding to the highest image similarity;

Using the target overdrive coefficient of the displayed image frame corresponding to the highest image similarity as the target overdrive coefficient of the image frame to be displayed; and Performing the step of overdrive control on the display device through the target overdrive coefficient corresponding to each display screen partition.

Comparation of the similarity between images can improve the speed of overdrive control.

In conclusion, embodiments of the present disclosure proposes a display overdrive control method, comprising: obtaining overdrive control reference parameters, backlight control information, and pixel signal statistical values of multiple virtual partitions of an image frame to be displayed for multiple display screen partitions of a display device; predicting a pixel signal amplitude of each display screen partition when displaying the image frame to be displayed based on the overdrive control reference parameters, the backlight control information, and the pixel signal statistical values; determining the overdrive coefficients corresponding to the pixel signal amplitude from the reference overdrive coefficients based on a mapping relationship between a preset pixel signal amplitude and the reference overdrive coefficients and the pixel signal amplitude; predicting a partition heat accumulation value of each display screen partition when displaying the image frame to be displayed based on the overdrive control reference parameters, the pixel signal amplitude, and the overdrive coefficients; performing a heat control correction on the overdrive coefficients of each display screen partition based on the partition heat accumulation value and the overdrive control reference parameters to obtain a target overdrive coefficient of each display screen partition; performing an overdrive control on the display device through the target overdrive coefficient corresponding to each display screen partition. In the embodiments of the present disclosure, the display screen of the display device is partitioned, and the heat accumulation status of each display screen partition is dynamically monitored to achieve dynamic control of the overdrive state of each display screen partition. Therefore, the overdrive duration can be improved, and the overdrive effect of the display device can be enhanced without changing the hardware structure of the display device.

To better implement the above method, the embodiments of the present disclosure further provide a display overdrive control device.

Referring to FIG. 7, the display overdrive control device includes a parameter acquisition unit 701, an amplitude prediction unit 702, a coefficient determination unit 703, a heat accumulation value prediction unit 704, a coefficient correction unit 705, and an overdrive control unit 706.

The parameter acquisition unit 701 is configured to obtain the overdrive control reference parameters, the backlight control information, and the pixel signal statistical values of multiple virtual partitions of the image frame to be displayed for multiple display screen partitions of the display device.

The amplitude prediction unit 702 is configured to predict the pixel signal amplitude of each display screen partition when displaying the image frame to be displayed based on the overdrive control reference parameters, the backlight control information, and the pixel signal statistical values;

The coefficient determination unit 703 is configured to determine the overdrive coefficients corresponding to the pixel signal amplitude from the reference overdrive coefficients based on the mapping relationship between the preset pixel signal amplitude and the reference overdrive coefficients and the pixel signal amplitude;

The heat accumulation value prediction unit 704 is configured to predict the partition heat accumulation value of each display screen partition when displaying the image frame to be displayed based on the overdrive control reference parameters, the pixel signal amplitude, and the overdrive coefficient;

The coefficient correction unit 705 is configured to perform a heat control correction on the overdrive coefficients of each display screen partition based on the partition heat accumulation value of the partition and the overdrive control reference parameters to obtain the target overdrive coefficient of each display screen partition;

The overdrive control unit 706 is configured to perform an overdrive control on the display device through the target overdrive coefficient corresponding to each display screen partition.

In some optional embodiment of the present disclosure, the display overdrive control device provided by the embodiments of the present disclosure may further include a statistics unit 707 configured to obtain the image frame to be displayed, and perform a partition processing on the image frame to be displayed to obtain multiple virtual partitions corresponding to the image frame to be displayed.

The statistics unit 707 is configured to calculate the average pixel signal value and the maximum pixel signal value of each virtual partition as pixel signal statistical values based on the pixel signals corresponding to each pixel point in each virtual partition.

In some optional embodiment of the present disclosure, the statistics unit is configured for obtaining the image frame to be displayed;

performing a non-uniform partition processing on the image frame to be displayed based on the pixel signals corresponding to each pixel point in the image frame to be displayed to obtain the plurality of virtual partitions corresponding to the image frame to be displayed.

In some optional embodiment of the present disclosure, the amplitude prediction unit is configured for predicting the pixel signal amplitude of each display screen partition when displaying the image frame to be displayed based on the overdrive control reference parameters, the backlight control information, and the pixel signal statistical values comprises: determining a virtual partition set corresponding to each display screen partition based on the display screen partition position of each display screen partition indicated by the overdrive control reference parameters and the virtual partition position corresponding to each virtual partition;

calculating an initial pixel signal amplitude corresponding to each display screen partition based on the pixel signal statistical values of each virtual partition in each virtual partition set;

when the initial pixel signal amplitude is less than a preset amplitude threshold, predicting the pixel signal amplitude of each display screen partition when displaying the image frame to be displayed based on the initial pixel signal amplitude, the overdrive control reference parameters, and the backlight control information.

In some optional embodiment of the present disclosure, the display overdrive control device further includes: a mapping table obtaining unit is configured for obtaining a preset pixel signal mapping table, where the pixel signal mapping table comprises a corresponding relationship between the pixel signal statistical values and pixel signal mapping function.

The amplitude prediction unit 702 is configured for determining a target pixel signal mapping function corresponding to each pixel signal statistical value based on the pixel signal statistical values of each virtual partition in each virtual partition set and the pixel signal mapping table;

mapping each pixel signal statistical value through the target pixel signal mapping function to obtain a pixel signal mapping value of each virtual partition; and calculating the initial pixel signal amplitude corresponding to each display screen partition based on the pixel signal mapping value of each virtual partition.

In some optional embodiment of the present disclosure, the pixel signal statistical values comprise the average pixel signal value. The amplitude prediction unit 702 is configured for mapping each average pixel signal value through the target pixel signal mapping function to obtain the average pixel signal mapping value of each virtual partition;

calculating a sum of the average pixel signal mapping value of each virtual partition in each virtual partition set based on the average pixel signal mapping values of each virtual partition to obtain a pixel signal amplitude sum corresponding to each virtual partition set; and determining the number of partitions in each virtual partition set, and respectively calculating the quotient of the pixel signal amplitude sum corresponding to each virtual partition set and the number of partitions for each virtual partition set to obtain the initial pixel signal amplitude of the display screen partition corresponding to each virtual partition set.

In some optional embodiment of the present disclosure, the overdrive control reference parameters comprise a maximum overdrive driving current. The amplitude prediction unit 702 is configured for multiplying the initial pixel signal amplitude by the backlight control information to calculate a backlight pixel signal amplitude of the display screen partition;

performing a division operation on the backlight pixel signal amplitude and the maximum overdrive driving current to obtain the pixel signal amplitude of each display screen partition when displaying the image frame to be displayed.

In some optional embodiment of the present disclosure, the pixel signal statistical values comprise a maximum pixel signal value. The display overdrive control device of the present disclosure further includes a maximum amplitude prediction unit 708 is configured for predicting a maximum pixel signal amplitude of each display screen partition when displaying the image frame to be displayed based on the overdrive control reference parameters and the maximum pixel signal value.

The coefficient determination unit 703 is configured for establishing an overdrive coefficient search index based on the maximum pixel signal amplitude and the pixel signal amplitude;

searching for the overdrive coefficient from the mapping relationship between the preset pixel signal amplitude and the reference overdrive coefficients based on the overdrive coefficient search index.

In some optional embodiment of the present disclosure, the overdrive control reference parameters of each display screen partition comprise an overdrive duration reference, a minimum average signal amplitude, and a partition overdrive weight of each display screen partition.

The coefficient correction unit 705 is configured for calculating the product of the overdrive duration reference, the minimum average signal amplitude, and the partition overdrive weight of each display screen partition to obtain a heat accumulation limit corresponding to each display screen partition;

comparing the partition heat accumulation value and the heat accumulation limit for each display screen partition;

for overheated display screen partitions with the partition heat accumulation value greater than the heat accumulation limit, reducing the overdrive coefficients of the overheated display screen partitions, so that the new partition heat accumulation value obtained when the overheated display screen partition performs overdrive display on the image frame to be displayed based on the reduced overdrive coefficient is not greater than the heat accumulation limit; and using the reduced overdrive coefficient of each overheated display screen partition as the target overdrive coefficient of each overheated display screen partition.

In some optional embodiment of the present disclosure, the display overdrive control device of the present disclosure further includes an adjacent coefficient correction unit 709 configured for at least reducing the overdrive coefficient of the adjacent display screen partitions that have a positional adjacency relationship with the overheated display screen partition based on the positional information of the overheated display screen partition;

using the reduced overdrive coefficient of each adjacent display screen partition as the target overdrive coefficient of each adjacent display screen partition.

In some optional embodiment of the present disclosure, the overdrive control reference parameters of each display screen partition comprise an overheat protection time reference, a minimum average signal amplitude, and a partition overdrive protection weight of each display screen partition. The display overdrive control device of the present disclosure further includes an overheat protection unit 710 configured for calculating the product of the overheat protection time reference, the minimum average signal amplitude, and the partition overdrive protection weight of each display screen partition to obtain a heat protection threshold corresponding to each display screen partition;

detecting current real partition heat accumulation value of each display screen partition, and comparing the real partition heat accumulation value of each display screen partition with the heat protection threshold;

controlling the display screen partition not to perform overdrive display for the display screen partitions whose real partition heat accumulation value is not less than the heat protection threshold.

In some optional embodiment of the present disclosure, the overdrive control reference parameters comprise a maximum overdrive driving current. The heat accumulation value prediction unit 704 is configured for predicting a partition heat increment value of each display screen partition when displaying the image frame to be displayed based on the maximum overdrive driving current, the pixel signal amplitude, and the overdrive coefficient in the overdrive control reference parameters;

obtaining a historical heat accumulation value of each display screen partition; and calculating the partition heat accumulation value of each display screen partition when displaying the image frame to be displayed based on the historical heat accumulation value and the partition heat increment value of each display screen partition.

In some optional embodiment of the present disclosure, the display overdrive control device of the present disclosure further includes a heat accumulation value updating unit is configured for detecting current real partition heat accumulation value of each display screen partition when displaying the image frame to be displayed;

using the real partition heat accumulation value as the new historical heat accumulation value of each display screen partition.

In some optional embodiment of the present disclosure, the parameter acquisition unit 701 is configured for obtaining the overdrive control reference parameters of a plurality of display screen partitions of the display device and the image frame to be displayed;

partitioning the image frame to be displayed based on the display screen partitions to obtain image blocks matching the display screen partitions;

obtaining the backlight control information based on a pixel signal processing of each image block; and obtaining the pixel signal statistical values of a plurality of virtual partitions of the image frame to be displayed.

From above embodiments of the present disclosure, the display overdrive control device is configured for obtaining overdrive control reference parameters, backlight control information, and pixel signal statistical values of multiple virtual partitions of an image frame to be displayed for multiple display screen partitions of a display device; predicting a pixel signal amplitude of each display screen partition when displaying the image frame to be displayed based on the overdrive control reference parameters, the backlight control information, and the pixel signal statistical values; determining the overdrive coefficients corresponding to the pixel signal amplitude from the reference overdrive coefficients based on a mapping relationship between a preset pixel signal amplitude and the reference overdrive coefficients and the pixel signal amplitude; predicting a partition heat accumulation value of each display screen partition when displaying the image frame to be displayed based on the overdrive control reference parameters, the pixel signal amplitude, and the overdrive coefficients; performing a heat control correction on the overdrive coefficients of each display screen partition based on the partition heat accumulation value and the overdrive control reference parameters to obtain a target overdrive coefficient of each display screen partition; performing an overdrive control on the display device through the target overdrive coefficient corresponding to each display screen partition. In the embodiments of the present disclosure, the display screen of the display device is partitioned, and the heat accumulation status of each display screen partition is dynamically monitored to achieve dynamic control of the overdrive state of each display screen partition. Therefore, the overdrive duration can be improved, and the overdrive effect of the display device can be enhanced without changing the hardware structure of the display device.

In addition, the embodiment of the present disclosure also provides an electronic device. The electronic device can be a terminal or a server. Please refer to FIG. 9 illustrating a schematic diagram of an electronic device according to an embodiment of the present disclosure.

The electronic device may comprise a radio frequency (RF) circuit 901, a memory 902 including one or more (only one is shown in the figure) computer-readable storage media, an input unit 903, a display unit 904, a sensor 905, an audio circuit 906, a wireless Fidelity (WiFi) module 907, a processor 908 including one or more (only one is shown in the figure) processing cores, and a power supply 909, etc. Those skilled in the art would understand that the electronic device is not limited to the structure of the electronic device shown in FIG. 9. The electronic device may comprise more or less components than those illustrated in the figure, or some components may be combined, or the electronic device may have different component arrangements.

The RF circuit 901 may be configured to receive and send a signal during an information receiving and sending process or a conversation process. Specifically, after receiving downlink information from a base station, the RF circuit 901 delivers the downlink information to one or more processors 180 for processing, and sends related uplink data to the base station. Generally, the RF circuit 901 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 901 may also communicate with a network and another device by wireless communication. The wireless communication may use any communications standard or protocol, which includes, but is not limited to, Global System of Mobile Communication (GSM), General Packet Radio Service (GPRS), Code Division Multiple Access (CDMA), Wideband Code Division Multiple Access (WCDMA, Wideband Code Division Multiple Access), Long Term Evolution (LTE), E-mail, Short Messaging Service (SMS), etc.

The memory 902 may be configured to store a software program and module. The processor 908 runs the software program and module stored in the memory 902, to implement various functional applications and data processing. The memory 902 may mainly include a program storage area and a data storage area. The program storage area may store an operating system, an application program required by at least one function (such as a sound playback function and an image display function), and the like. The data storage area may store data (such as audio data and an address book) created according to use of the electronic device, and the like. In addition, the memory 902 may include a high speed random access memory, and may also include a non-volatile memory, such as at least one magnetic disk storage device, a flash memory device, or another volatile solid-state storage device. Correspondingly, the memory 902 may further include a memory controller, so that the processor 908 and the input unit 903 access the memory 902.

The input unit 903 may be configured to receive input digit or character information, and generate keyboard, mouse, joystick, optical, or track ball signal input related to the user setting and function control. Specifically, the input unit 903 may include a touch-sensitive surface and other input device. The touch-sensitive surface may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 908. Moreover, the touch controller can receive and execute a command sent from the processor 908. In addition, the touch-sensitive surface may be implemented by using various types, such as a resistive type, a capacitance type, an infrared type, and a surface sound wave type. In addition to the touch-sensitive surface, the input unit 903 may further include the another input device. Specifically, the another input device may include, but is not limited to, one or more of a physical keyboard, a functional key (such as a volume control key or a switch key), a track ball, a mouse, and a joystick.

The display unit 904 may be configured to display information input by the user or information provided for the user, and various graphical user ports of the electronic device. The graphical user ports may be formed by a graph, a text, an icon, a video, and any combination thereof. The display unit 904 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 908, so as to determine a type of a touch event. Then, the processor 908 provides corresponding visual output on the display panel according to the type of the touch event. Although, in FIG. 9, the touch-sensitive surface and the display panel are used as two separate parts to implement input and output functions, in some embodiments, the touch-sensitive surface and the display panel may be integrated to implement the input and output functions.

The electronic device may further include at least one sensor 905, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the electronic device is moved to the car. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the electronic device are not further described herein.

The audio circuit 906, a loudspeaker, and a microphone may provide audio interfaces between the user and the electronic device. The audio circuit 906 may transmit, to the loudspeaker, a received electric signal converted from received audio data. The loudspeaker converts the electric signal into a sound signal for output. On the other hand, the microphone converts a collected sound signal into an electric signal. The audio circuit 906 receives the electric signal and converts the electric signal into audio data, and outputs the audio data to the processor 908 for processing. Then, the processor 908 sends the audio data to, for example, another terminal by using the RF circuit 901, or outputs the audio data to the memory 902 for further processing. The audio circuit 906 may further include an earplug jack, so as to provide communication between a peripheral carphone and the electronic device.

WiFi belongs to short-distance wireless transmission technology. The electronic devices can help users send and receive email, browsing the web and accessing streaming media through the WiFi module 907. The WiFi module 907 provides users with wireless broadband Internet access. Although FIG. 9 shows the WiFi module 907, it is understandable that it is not a necessary component of an electronic device and can be omitted as necessary without altering the nature of the invention.

The processor 908 is a control center of the electronic device, and connects various parts of the terminal by using various interfaces and lines. By running or executing the software program and/or module stored in the memory 902, and invoking data stored in the memory 902, the processor 908 performs various functions and data processing of the electronic device, thereby performing overall monitoring on the mobile phone. Optionally, the processor 908 may include one or more processing cores. Preferably, the processor 908 may integrate an application processor and a modem. The application processor mainly processes an operating system, a user interface, an application program, and the like. The modem mainly processes wireless communication. It may be understood that, the foregoing modem may not be integrated into the processor 908.

The electronic device further includes the power supply 909 (such as a battery) for supplying power to the components. Preferably, the power supply may be logically connected to the processor 908 by using a power supply management system, thereby implementing functions, such as charging, discharging, and power consumption management, by using the power supply management system. The power supply 909 may further include any component, such as one or more direct current or alternate current power supplies, a re-charging system, a power supply fault detection circuit, a power supply converter or an inverter, and a power supply state indicator.

The electronic device may further comprise a camera (such as a front camera, a rear camera), a Bluetooth module, and the like, and a description in this regard is not provided. In greater detail, a display unit of the mobile terminal is a touch screen display according to the present embodiment. The mobile terminal further comprises a memory and one or more programs. The one or one or more programs are stored in the memory, and are configured to be executed by one or more processors to perform operations of:

obtaining overdrive control reference parameters, backlight control information, and pixel signal statistical values of a plurality of virtual partitions of an image frame to be displayed for a plurality of display screen partitions of a display device;

predicting a pixel signal amplitude of each display screen partition when displaying the image frame to be displayed based on the overdrive control reference parameters, the backlight control information, and the pixel signal statistical values;

determining overdrive coefficients corresponding to the pixel signal amplitudes from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficient;

performing a heat control correction on the overdrive coefficients of each display screen partition based on the partition heat accumulation value and the overdrive control reference parameters to obtain a target overdrive coefficient of each display screen partition; and performing an overdrive control on the display device through the target overdrive coefficient corresponding to each display screen partition.

A person skilled in the art may understand that all or part of the steps in the various methods of the above embodiments may be completed by instructions or by hardware controlled by related instructions. The instructions may be stored in a computer-readable storage medium and loaded and executed by a processor.

For this purpose, an embodiment of the present invention provides a computer-readable storage medium in which a plurality of instructions are stored capable of being loaded by a processor to perform steps in any of the display overdrive control methods provided in the embodiment of the present invention. For example, the instructions executable a processor to perform the following operations comprising:

obtaining overdrive control reference parameters, backlight control information, and pixel signal statistical values of a plurality of virtual partitions of an image frame to be displayed for a plurality of display screen partitions of a display device;

predicting a pixel signal amplitude of each display screen partition when displaying the image frame to be displayed based on the overdrive control reference parameters, the backlight control information, and the pixel signal statistical values;

determining overdrive coefficients corresponding to the pixel signal amplitudes from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficient;

performing a heat control correction on the overdrive coefficients of each display screen partition based on the partition heat accumulation value and the overdrive control reference parameters to obtain a target overdrive coefficient of each display screen partition;

performing an overdrive control on the display device through the target overdrive coefficient corresponding to each display screen partition.

The specific implementation of each of the above operations can be found in the previous embodiment, which will not be repeated here.

The computer readable storage medium may include: Read Only Memory (ROM), Random Access Memory (RAM), disk or optical disc, etc.

Because the instruction stored in the computer-readable storage medium can execute the steps in any of the display overdrive control methods provided in the embodiments of the present invention. Therefore, the beneficial effects that can be achieved by any of the display overdrive control methods provided in the embodiments of the present invention can be realized, and will not be repeated herein.

According to one aspect of the present disclosure, a computer program product or computer program comprising computer instructions stored in a computer-readable storage medium is also provided. The processor of the electronic device reads the computer instruction from a computer-readable storage medium, and the processor executes the computer instruction so that the electronic device performs the method provided in the various optional implementations in the preceding embodiment.

A display overdrive control method, device, electronic device and storage medium provided in the embodiment of the present invention are described in detail above. The above embodiments of the present disclosure are described in detail, and the principle and embodiment of the present disclosure are elaborated in this article by applying specific examples, and the description of the above embodiments is only used to help understand the technical scheme of the present disclosure and its core ideas; A person skilled in the art should understand that he may still modify the technical solutions recorded in the foregoing embodiments, or replace some of the technical features therein. And these modifications or substitutions do not make the essence of the corresponding technical solutions out of the scope of the technical solutions of the embodiments of the present disclosure.

What is claimed is:

1. A display overdrive control method, comprising:

obtaining overdrive control reference parameters, backlight control information, and pixel signal statistical values of a plurality of virtual partitions of an image frame to be displayed for a plurality of display screen partitions of a display device;

predicting a pixel signal amplitude of each display screen partition when displaying the image frame to be displayed based on the overdrive control reference parameters, the backlight control information, and the pixel signal statistical values;

determining overdrive coefficients corresponding to the pixel signal amplitudes from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficient;

performing a heat control correction on the overdrive coefficients of each display screen partition based on the partition heat accumulation value and the overdrive control reference parameters to obtain a target overdrive coefficient of each display screen partition; and performing an overdrive control on the display device through the target overdrive coefficient corresponding to each display screen partition.

2. The display overdrive control method of claim 1, before the obtaining overdrive control reference parameters, backlight control information, and pixel signal statistical values of a plurality of virtual partitions of an image frame to be displayed for a plurality of display screen partitions of a display device, the method further comprises:

obtaining the image frame to be displayed, and performing a partition processing on the image frame to be displayed to obtain the plurality of virtual partitions corresponding to the image frame to be displayed; and calculating an average pixel signal value and the maximum pixel signal value of each virtual partition as the pixel signal statistical values based on pixel signals corresponding to each pixel point in each virtual partition.

3. The display overdrive control method of claim 2, wherein obtaining the image frame to be displayed, and performing the partition processing on the image frame to be displayed to obtain the multiple virtual partitions corresponding to the image frame to be displayed comprises:

obtaining the image frame to be displayed; and performing a non-uniform partition processing on the image frame to be displayed based on the pixel signals corresponding to each pixel point in the image frame to be displayed to obtain the plurality of virtual partitions corresponding to the image frame to be displayed.

4. The display overdrive control method of claim 1, wherein predicting the pixel signal amplitude of each display screen partition when displaying the image frame to be displayed based on the overdrive control reference parameters, the backlight control information, and the pixel signal statistical values comprises: determining a virtual partition set corresponding to each display screen partition based on the display screen partition position of each display screen partition indicated by the overdrive control reference parameters and the virtual partition position corresponding to each virtual partition;

calculating an initial pixel signal amplitude corresponding to each display screen partition based on the pixel signal statistical values of each virtual partition in each virtual partition set; and when the initial pixel signal amplitude is less than a preset amplitude threshold, predicting the pixel signal amplitude of each display screen partition when displaying the image frame to be displayed based on the initial pixel signal amplitude, the overdrive control reference parameters, and the backlight control information.

5. The display overdrive control method of claim 4, wherein before calculating the initial pixel signal amplitude corresponding to each display screen partition based on the pixel signal statistical values of each virtual partition in each virtual partition set, the method further comprises:

obtaining a preset pixel signal mapping table, wherein the pixel signal mapping table comprises a corresponding relationship between the pixel signal statistical values and pixel signal mapping function;

calculating the initial pixel signal amplitude corresponding to each display screen partition based on the pixel signal statistical values of each virtual partition in each virtual partition set, comprising:

determining a target pixel signal mapping function corresponding to each pixel signal statistical value based on the pixel signal statistical values of each virtual partition in each virtual partition set and the pixel signal mapping table;

mapping each pixel signal statistical value through the target pixel signal mapping function to obtain a pixel signal mapping value of each virtual partition; and calculating the initial pixel signal amplitude corresponding to each display screen partition based on the pixel signal mapping value of each virtual partition.

6. The display overdrive control method of claim 5, wherein the pixel signal statistical values comprise the average pixel signal value;

mapping each pixel signal statistical value through the target pixel signal mapping function to obtain the pixel signal mapping value of each virtual partition comprising:

mapping each average pixel signal value through the target pixel signal mapping function to obtain the average pixel signal mapping value of each virtual partition;

calculating the initial pixel signal amplitude corresponding to each display screen partition based on the pixel signal mapping values of each virtual partition comprising:

calculating a sum of the average pixel signal mapping value of each virtual partition in each virtual partition set based on the average pixel signal mapping values of each virtual partition to obtain a pixel signal amplitude sum corresponding to each virtual partition set; and determining the number of partitions in each virtual partition set, and respectively calculating the quotient of the pixel signal amplitude sum corresponding to each virtual partition set and the number of partitions for each virtual partition set to obtain the initial pixel signal amplitude of the display screen partition corresponding to each virtual partition set.

7. The display overdrive control method of claim 4, wherein the overdrive control reference parameters comprise a maximum overdrive driving current;

predicting the pixel signal amplitude of each display screen partition when displaying the image frame to be displayed based on the initial pixel signal amplitude, the overdrive control reference parameters, and the backlight control information, comprising:

multiplying the initial pixel signal amplitude by the backlight control information to calculate a backlight pixel signal amplitude of the display screen partition; and performing a division operation on the backlight pixel signal amplitude and the maximum overdrive driving current to obtain the pixel signal amplitude of each display screen partition when displaying the image frame to be displayed.

8. The display overdrive control method of claim 1, wherein the pixel signal statistical values comprise a maximum pixel signal value;

before the determining overdrive coefficients corresponding to the pixel signal amplitudes from the reference overdrive coefficients based on a mapping relationship between a preset pixel signal amplitude and the reference overdrive coefficients and the pixel signal amplitude, the method further comprising:

predicting a maximum pixel signal amplitude of each display screen partition when displaying the image frame to be displayed based on the overdrive control reference parameters and the maximum pixel signal value;

the determining overdrive coefficients corresponding to the pixel signal amplitudes from the reference overdrive coefficients based on a mapping relationship between a preset pixel signal amplitude and the reference overdrive coefficients and the pixel signal amplitude comprising:

establishing an overdrive coefficient search index based on the maximum pixel signal amplitude and the pixel signal amplitude; and searching for the overdrive coefficient from the mapping relationship between the preset pixel signal amplitude and the reference overdrive coefficients based on the overdrive coefficient search index.

9. The display overdrive control method of claim 1, wherein the overdrive control reference parameters of each display screen partition comprise an overdrive duration reference, a minimum average signal amplitude, and a partition overdrive weight of each display screen partition;

the performing a heat control correction on the overdrive coefficients of each display screen partition based on the partition heat accumulation value and the overdrive control reference parameters to obtain a target overdrive coefficient of each display screen partition, comprises:

calculating the product of the overdrive duration reference, the minimum average signal amplitude, and the partition overdrive weight of each display screen partition to obtain a heat accumulation limit corresponding to each display screen partition;

comparing the partition heat accumulation value and the heat accumulation limit for each display screen partition;

for overheated display screen partitions with the partition heat accumulation value greater than the heat accumulation limit, reducing the overdrive coefficients of the overheated display screen partitions, so that the new partition heat accumulation value obtained when the overheated display screen partition performs overdrive display on the image frame to be displayed based on the reduced overdrive coefficient is not greater than the heat accumulation limit; and using the reduced overdrive coefficient of each overheated display screen partition as the target overdrive coefficient of each overheated display screen partition.

10. The display overdrive control method of claim 9, further comprising:

at least reducing the overdrive coefficient of the adjacent display screen partitions that have a positional adjacency relationship with the overheated display screen partition based on the positional information of the overheated display screen partition; and using the reduced overdrive coefficient of each adjacent display screen partition as the target overdrive coefficient of each adjacent display screen partition.

11. The display overdrive control method of claim 9, further comprising:

amplifying the overdrive coefficient of the overdrive display screen partitions whose partition heat accumulation value is not greater than the heat accumulation limit, so that the new partition heat accumulation value obtained when the overdrive display screen partition performs overdrive display on the image frame to be displayed based on the amplified overdrive coefficient is not greater than the heat accumulation limit.

12. The display overdrive control method of claim 1, wherein the overdrive control reference parameters of each display screen partition comprise an overheat protection time reference, a minimum average signal amplitude, and a partition overdrive protection weight of each display screen partition, the method further comprising:

calculating the product of the overheat protection time reference, the minimum average signal amplitude, and the partition overdrive protection weight of each display screen partition to obtain a heat protection threshold corresponding to each display screen partition;

detecting current real partition heat accumulation value of each display screen partition, and comparing the real partition heat accumulation value of each display screen partition with the heat protection threshold; and controlling the display screen partition not to perform overdrive display for the display screen partitions whose real partition heat accumulation value is not less than the heat protection threshold.

13. The display overdrive control method of claim 1, wherein the overdrive control reference parameters comprise a maximum overdrive driving current;

the predicting a partition heat accumulation value of each display screen partition when displaying the image frame to be displayed based on the overdrive control reference parameters, the pixel signal amplitude, and the overdrive coefficient, comprises:

predicting a partition heat increment value of each display screen partition when displaying the image frame to be displayed based on the maximum overdrive driving current, the pixel signal amplitude, and the overdrive coefficient in the overdrive control reference parameters;

obtaining a historical heat accumulation value of each display screen partition; and calculating the partition heat accumulation value of each display screen partition when displaying the image frame to be displayed based on the historical heat accumulation value and the partition heat increment value of each display screen partition.

14. The display overdrive control method of claim 13, further comprising:

detecting current real partition heat accumulation value of each display screen partition when displaying the image frame to be displayed; and using the real partition heat accumulation value as the new historical heat accumulation value of each display screen partition.

15. The display overdrive control method of claim 1, wherein the obtaining overdrive control reference parameters, backlight control information, and pixel signal statistical values of a plurality of virtual partitions of an image frame to be displayed for a plurality of display screen partitions of a display device, comprises:

obtaining the overdrive control reference parameters of a plurality of display screen partitions of the display device and the image frame to be displayed;

partitioning the image frame to be displayed based on the display screen partitions to obtain image blocks matching the display screen partitions;

obtaining the backlight control information based on a pixel signal processing of each image block; and obtaining the pixel signal statistical values of a plurality of virtual partitions of the image frame to be displayed.

16. The display overdrive control method of claim 1, wherein before the obtaining overdrive control reference parameters, backlight control information, and pixel signal statistical values of a plurality of virtual partitions of an image frame to be displayed for a plurality of display screen partitions of a display device, the method further comprises:

obtaining the image frame to be displayed and the displayed image frame of the display device;

performing a similarity matching between the image frame to be displayed and the displayed image frame to obtain an image similarity between the image frame to be displayed and each displayed image frame;

when the image similarity is greater than a preset similarity threshold, obtaining the target overdrive coefficient of each display screen partition when displaying the displayed image frame corresponding to the highest image similarity;

using the target overdrive coefficient of the displayed image frame corresponding to the highest image similarity as the target overdrive coefficient of the image frame to be displayed; and performing the overdrive control on the display device through the target overdrive coefficient corresponding to each display screen partition.

17. An electronic device comprising a processor and a memory storing computer-readable instructions executable by the processor to perform operations comprising:

obtaining overdrive control reference parameters, backlight control information, and pixel signal statistical values of a plurality of virtual partitions of an image frame to be displayed for a plurality of display screen partitions of a display device;

predicting a pixel signal amplitude of each display screen partition when displaying the image frame to be displayed based on the overdrive control reference parameters, the backlight control information, and the pixel signal statistical values;

determining overdrive coefficients corresponding to the pixel signal amplitudes from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficient;

performing a heat control correction on the overdrive coefficients of each display screen partition based on the partition heat accumulation value and the overdrive control reference parameters to obtain a target overdrive coefficient of each display screen partition; and performing an overdrive control on the display device through the target overdrive coefficient corresponding to each display screen partition.

18. A non-transitory computer-readable storage medium storing computer-readable instructions executable by the processor to perform operations comprising:

obtaining overdrive control reference parameters, backlight control information, and pixel signal statistical values of a plurality of virtual partitions of an image frame to be displayed for a plurality of display screen partitions of a display device;

predicting a pixel signal amplitude of each display screen partition when displaying the image frame to be displayed based on the overdrive control reference parameters, the backlight control information, and the pixel signal statistical values;

determining overdrive coefficients corresponding to the pixel signal amplitudes from the reference overdrive coefficients based on a mapping relationship between a preset pixel signal amplitude and the reference overdrive coefficients and the pixel signal amplitude;

predicting a partition heat accumulation value of each display screen partition when displaying the image frame to be displayed based on the overdrive control reference parameters, the pixel signal amplitude, and the overdrive coefficient;

performing a heat control correction on the overdrive coefficients of each display screen partition based on the partition heat accumulation value and the overdrive control reference parameters to obtain a target overdrive coefficient of each display screen partition; and performing an overdrive control on the display device through the target overdrive coefficient corresponding to each display screen partition.

19. The electronic device of claim 17, wherein the operations further comprise:

obtaining the image frame to be displayed, and performing a partition processing on the image frame to be displayed to obtain the plurality of virtual partitions corresponding to the image frame to be displayed; and calculating an average pixel signal value and the maximum pixel signal value of each virtual partition as the pixel signal statistical values based on pixel signals corresponding to each pixel point in each virtual partition.

20. The electronic device of claim 19, wherein the obtaining the image frame to be displayed, and performing the partition processing on the image frame to be displayed to obtain the multiple virtual partitions corresponding to the image frame to be displayed comprises:

obtaining the image frame to be displayed; and performing a non-uniform partition processing on the image frame to be displayed based on the pixel signals corresponding to each pixel point in the image frame to be displayed to obtain the plurality of virtual partitions corresponding to the image frame to be displayed.

* * * * *